(12) United States Patent
Hanano et al.

(10) Patent No.: US 8,302,992 B2
(45) Date of Patent: Nov. 6, 2012

(54) GAS GENERATOR AND ASSEMBLING METHOD OF THE SAME

(75) Inventors: Teppei Hanano, Hyogo (JP); Masayuki Yamazaki, Hyogo (JP)

(73) Assignee: Daicel Chemical Industries, Ltd., Osaka (JP)

( * ) Notice: Subject to any disclaimer, the term of this patent is extended or adjusted under 35 U.S.C. 154(b) by 136 days.

(21) Appl. No.: 13/019,864

(22) Filed: Feb. 2, 2011

(65) Prior Publication Data

US 2011/0187088 A1 Aug. 4, 2011

Related U.S. Application Data

(60) Provisional application No. 61/301,442, filed on Feb. 4, 2010.

(30) Foreign Application Priority Data

Feb. 3, 2010 (JP) .................................. 2010-21863

(51) Int. Cl.
*B60R 21/261* (2011.01)
*B60R 21/263* (2011.01)
*B60R 21/264* (2006.01)

(52) U.S. Cl. ......... 280/740; 280/737; 280/741; 102/531

(58) Field of Classification Search .................. 280/736, 280/737, 738, 740, 741, 742; 102/530, 531
See application file for complete search history.

(56) References Cited

U.S. PATENT DOCUMENTS

| | | | |
|---|---|---|---|
| 5,551,724 A * | 9/1996 | Armstrong et al. | ........... 280/737 |
| 7,343,862 B2 | 3/2008 | McCormick | |
| 7,654,565 B2 | 2/2010 | McCormick et al. | |
| 7,814,838 B2 | 10/2010 | McCormick | |
| 7,878,536 B2 * | 2/2011 | Rose et al. | .................... 280/737 |
| 7,950,691 B1 | 5/2011 | Mayville | |
| 2002/0148543 A1 | 10/2002 | Rink et al. | |
| 2007/0024038 A1 * | 2/2007 | Numoto et al. | ............... 280/736 |
| 2008/0078486 A1 | 4/2008 | Khandhadia et al. | |
| 2010/0109295 A1 * | 5/2010 | McCormick et al. | ...... 280/728.1 |

FOREIGN PATENT DOCUMENTS

| | | |
|---|---|---|
| DE | 102007048736 A1 * | 4/2009 |
| EP | 2 084 486 B1 | 5/2009 |
| FR | 2 907 892 A1 | 5/2008 |
| FR | 2 907 893 A1 | 5/2008 |

* cited by examiner

*Primary Examiner* — Ruth Ilan
*Assistant Examiner* — Keith Frisby
(74) *Attorney, Agent, or Firm* — Birch, Stewart, Kolasch & Birch, LLP

(57) ABSTRACT

The present invention provides a gas generator, including:
a tubular housing, an ignition device attached to one end of the tubular housing, a diffuser portion having a gas discharge port and being attached to the other end of the tubular housing,
in the tubular housing,
a first combustion chamber defined by a first perforated-plate member on one end side in the tubular housing and filled with a first gas generating agent,
a tubular member disposed in the remaining inner space of the tubular housing and having a communication hole on a peripheral wall portion thereof, a second-perforated plate member disposed between the first perforated-plate member and the tubular member, a second combustion chamber defined by the tubular member and filled with a second gas generating agent,
the tubular member being disposed so that a gap is formed between the peripheral wall portion of the tubular housing and the tubular member, the tubular member having a first opening end portion abutting against the inner peripheral surface of the tubular housing in the side of the first perforated-plate member and a second end portion supported in the side of the diffuser portion.

4 Claims, 3 Drawing Sheets

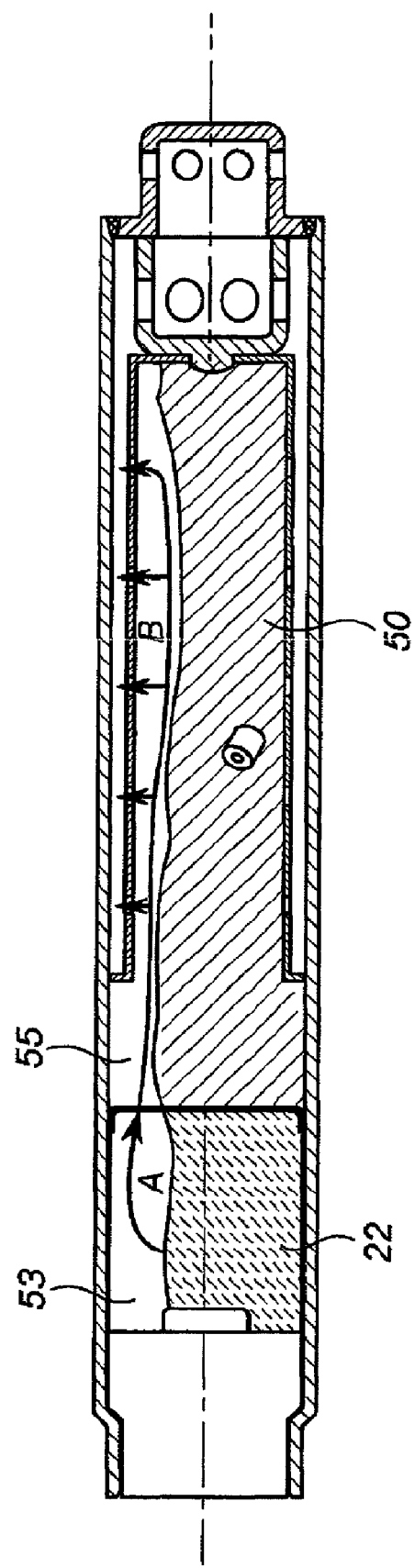

ND ASSEMBLING
GAS GENERATOR AND ASSEMBLING METHOD OF THE SAME

This nonprovisional application claims priority under 35 U.S.C. §119(a) to Patent Application No. 2010-21863 filed in Japan on 3 Feb. 2010 and 35 U.S.C. §119(e) to U.S. Provisional Application No. 61/301,442 filed on 4 Feb. 2010, both of which are incorporated by reference.

BACKGROUND OF THE INVENTION

1. Field of the Invention

The present invention relates to a gas generator used in a restraining device in a vehicle and the like such as an air bag device, and more particularly to a gas generator used in an air bag system for deploying an air bag in the lateral side of an occupant.

2. Description of Related Arts

A gas generator used in a device that deploys the air bag in the lateral side of the occupant is often formed in an elongated cylindrical shape because of the place where the gas generator is attached. A cylindrical housing is disposed inside a vehicle in the substantially vertical direction or the horizontal direction.

US-A, No. 2008/0078486 discloses the gas generator in which an initiator 32 is disposed at one end portion of an elongated outer housing 12 and a diffuser portion formed with a gas discharge port 20 is provided in an opposite end portion.

In this gas generator, a booster cup 23 storing a booster agent 24 and a divider 28 formed with an opening 28a are disposed in the vicinity of the initiator 32. A gas generating agent 16 is disposed in a space formed by an inner housing 14. A tubular gas passage is formed between the outer housing 12 and the inner housing 14.

The booster 24 burned by the initiator 32 generates combustion products that enter the interior of the inner housing 14 through the opening 28a and burn the gas generating agent 16. Gas generated from the gas generating agent 16 passes through an orifice 18 in the inner housing 14 and escapes through a tubular gap between the outer housing 12 and the inner housing 14 to be discharged from the gas discharge port 20 in the diffuser portion. Parts such as the inner housing 14 realize a formation in which gas flows in a zig-zag pattern, and a conventional filter is not used.

When the gas generator is installed horizontally as illustrated in FIG. 1 of US-A No. 2008/0078486, vibration and the like applied over time to the gas generator installed in a vehicle may cause the gas generating agent 16 to become biased toward a lower side, as shown in the drawing, in a combustion chamber inside the inner housing 14 and may lead to a formation of a gap at an upper side. This tendency increases when, in particular, the gas generating agent 16 disposed in the combustion chamber is not sufficiently held.

When such a gap is created, the combustion products generated by the booster ignites only a part of the gas generating agent 16 and the remainder of the combustion products flows through the gap to the side of the diffuser. In addition, combustion gas generated from the gas generating agent also flows through the gap towards the diffuser portion without igniting the unburned gas generating agent 16 existing in the combustion chamber. Therefore, a sufficient ability to ignite the gas generating agent 16 cannot be secured, leaving room for improvement.

SUMMARY OF THE INVENTION

Invention 1 provides a gas generator, including:

a tubular housing, an ignition device attached to one end of the tubular housing, a diffuser portion having a gas discharge port and being attached to the other end of the tubular housing, in the tubular housing, a first combustion chamber defined by a first perforated-plate member on one end side in the tubular housing and filled with a first gas generating agent, a tubular member disposed in the remaining inner space of the tubular housing and having a communication hole on a peripheral wall portion thereof, a second-perforated plate member disposed between the first perforated-plate member and the tubular member, a second combustion chamber defined by the tubular member and filled with a second gas generating agent, the tubular member being disposed so that a gap is formed between the peripheral wall portion of the tubular housing and the tubular member, the tubular member having a first opening end portion abutting against the inner peripheral surface of the tubular housing in the side of the first perforated-plate member and a second end portion supported in the side of the diffuser portion.

Invention 2 provides a gas generator according to invention 1, wherein the tubular member includes an enlarged diameter part provided with an increased diameter at an opening portion in a side of the first opening end portion and a central hole at the center of a bottom surface in a side of the second end portion, a cup-shaped gas diverting member having a communication hole on a peripheral wall portion and a projection on a bottom surface is disposed in the side of the diffuser portion so that an opening portion of the gas diverting member is oriented toward the diffuser portion, the enlarged diameter part of the tubular member abuts against the inner peripheral surface of the tubular housing, and the central hole of the tubular member is fitted to the projection on the bottom surface of the gas diverting member.

Invention 3 provides a method of assembling the gas generator according to invention 1, including:

a step of attaching a tubular member inside a tubular housing to which a diffuser portion having a gas discharge port is attached on the other end;

a step of filling the tubular member with a predetermined amount of a second gas generating agent from one end of the tubular housing while tapping the tubular housing;

a step of press-fitting a second perforated-plate member from one end of the tubular housing to form a second combustion chamber filled with the second gas generating agent;

a step of press-fitting a first perforated-plate member from one end of the tubular housing;

a step of charging a first gas generating agent from one end of the tubular housing so as to abut against the first perforated-plate member; and a step of attaching an ignition device to one end of the tubular housing.

Invention 4 provides a method of assembling the gas generator according to invention 2, including:

a step of attaching a cup-shaped gas diverting member, having a communication hole on a peripheral wall portion and a projection on a bottom surface, inside a tubular housing, the tubular housing including a diffuser portion having a gas discharge port attached to the other end so that an opening portion of the gas diverting member is oriented toward the diffuser portion;

a step of attaching a tubular member so that an outer peripheral surface of an enlarged diameter part of the tubular member abuts against an inner peripheral surface of the tubular housing and a central hole of the tubular member fits to the projection on the bottom surface of the gas diverting member;

a step of filling the tubular member with a predetermined amount of a second gas generating agent while tapping the tubular housing;

a step of press-fitting a second perforated-plate to form a second combustion chamber filled with the second gas generating agent;

a step of press-fitting a first perforated-plate member;

a step of charging a first gas generating agent so as to abut against the first perforated-plate member; and a step of attaching an ignition device.

BRIEF DESCRIPTION OF THE DRAWINGS

The present invention will become more fully understood from the detailed description given hereinbelow and the accompanying drawings which are given by way of illustration only, and thus are not limitative of the present invention and wherein:

FIG. 3 is a sectional view showing a gas generator according to a comparative example of the present invention.

DETAILED DESCRIPTION OF THE INVENTION

Figure 1:
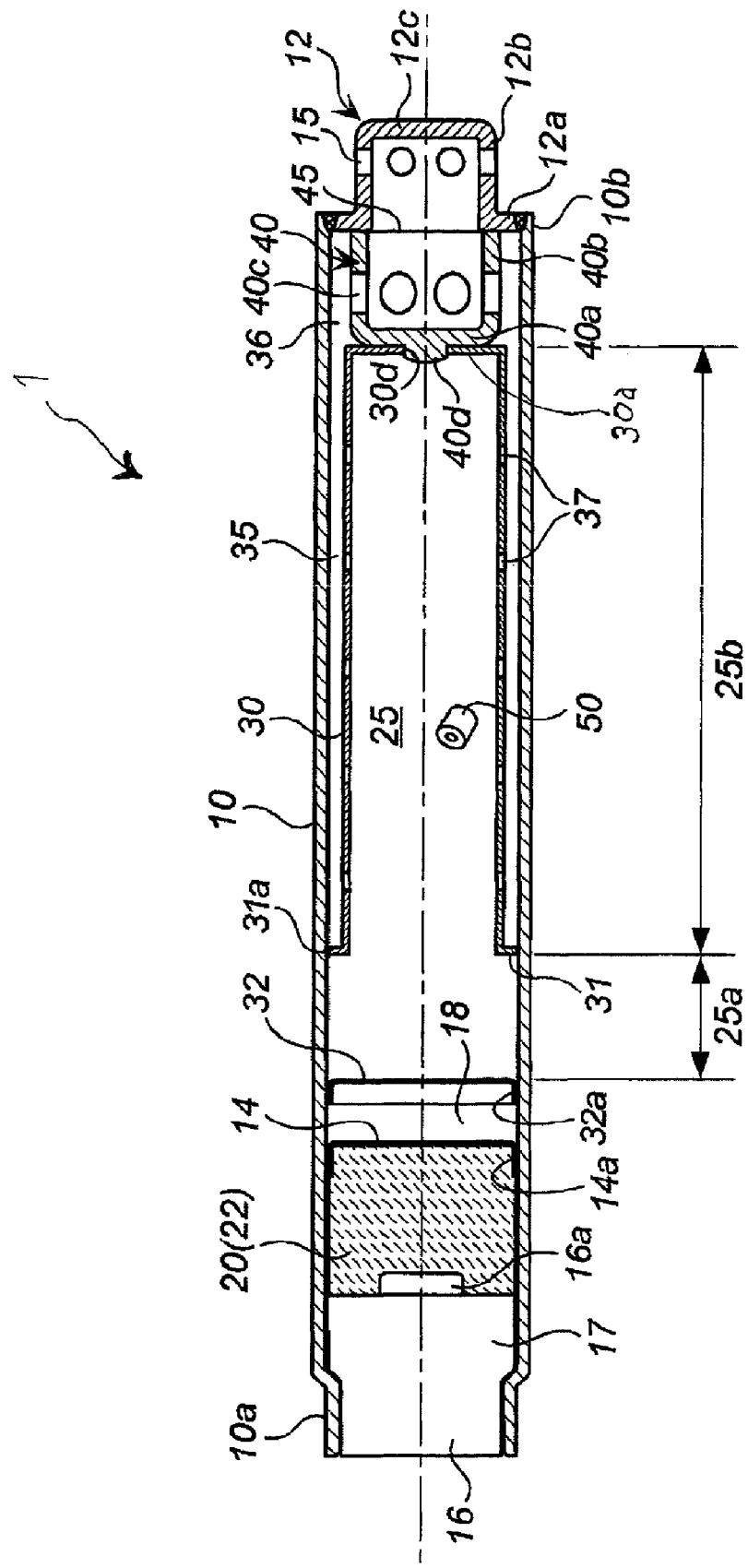
FIG. 1 is an axial sectional view showing a gas generator according to an embodiment of the present invention.

The present invention provides an elongated gas generator with an improved ability to ignite a whole gas generating agent regardless of an installation condition of the gas generator in a vehicle.

The ignition device is a combination of a known electric igniter and a known transfer charge or gas generating agent, and is mounted in the side of one end of the tubular housing.

The diffuser portion may be one used in a known inflator and is favorably a cup-shaped diffuser portion having a flange at an opening portion and having a plurality of gas discharge ports on a peripheral wall surface. The diffuser portion is mounted in the side of the other end of the tubular housing.

The first combustion chamber is a space formed by the first perforated-plate member disposed in the tubular housing, the tubular housing, and an igniter (or a collar that fixes the igniter), and is filled with the first gas generating agent.

The first combustion chamber is formed by dividing the tubular housing by the first perforated-plate member provided in the side of the other end (nearer the diffuser portion) of the tubular housing. The first perforated-plate member has a plurality of through-holes, and favorably has a flange portion on a peripheral edge portion and is made of a flexible metal. No particular limits are imposed on the number of the plurality of through-holes, opening sizes of the through-holes, positions where the through-holes are formed, and the like. The first combustion chamber stores the ignition device and is also filled with the first gas generating agent.

The second combustion chamber is formed and surrounded by the tubular member having a communication hole on the peripheral wall portion, the second perforated-plate member disposed between the first perforated-plate member and the tubular member, and the tubular housing. The second combustion chamber is filled with the second gas generating agent.

The second perforated-plate member has a plurality of through-holes, and favorably has a flange portion on a peripheral edge portion and is made of flexible metal. No particular limits are imposed on the number of the plurality of through-holes, opening sizes of the through-holes, positions where the through-holes are formed, and the like. The use of such a second perforated-plate member makes it easier to adjust the volume of the second combustion chamber, and by pressing the second gas generating agent with the second perforated-plate member, the second gas generating agent can be filled densely and be prevented from shifting.

Furthermore, by disposing the second perforated-plate member between the tubular member and the first perforated-plate member, a gap (space) is formed between the first perforated-plate member and the second perforated-plate member. Therefore, since combustion gas generated in the first combustion chamber and passed through the through-holes of the first perforated-plate member fills the entire space and then flows into the second combustion chamber through the through-holes of the second perforated-plate member, the second gas generating agent becomes more likely to burn uniformly from an end portion and spotty ignition can now be suppressed.

The tubular member favorably has a communication hole (more favorably, a plurality of communication holes) on a peripheral wall portion and is made of flexible metal. The communication hole can be formed at equal intervals in the axial direction and the circumferential direction of the tubular member, respectively. In addition, the communication holes can be formed in the side of the diffuser portion. In this case, the number and diameters of the communication holes are adjusted so that an opening area in the side of the diffuser portion is larger.

The tubular member is disposed so as to form a gap (tubular gap) with the peripheral wall portion of the tubular housing, and has the first opening end portion and a second end portion. The first opening end portion is abutted against the inner peripheral surface of the housing and oriented toward the one end of the housing (towards the ignition device). The second end portion is supported in the side of the diffuser portion.

The tubular gap becomes a discharge pathway of combustion gas to the diffuser portion when the inflator is in operation. During the flow of the combustion gas through the tubular gap to the diffuser portion, the combustion gas is more likely to come into contact with the tubular member and a wall surface of the tubular housing which form the gap, thereby improving a residue collection function and a cooling function. In addition, since the gas flowing through the tubular gap reaches the gas discharge port without having the flow blocked, the period of time from ignition to gas discharge can be reduced.

An outer diameter of the tubular member for forming the gap with the peripheral wall portion of the tubular housing is set smaller than an inner diameter of the tubular housing.

The tubular member has a communication hole which is formed on a peripheral wall portion and that communicates the interior of the tubular member (second combustion chamber) with the tubular gap. In this case, if a space is formed inside the tubular member (second combustion chamber) due to movement of the second gas generating agent (for example, shifting towards one side), a part of the combustion gas generated in the first combustion chamber is more likely to pass through this space and flow into the tubular gap via the communication hole.

However, with the gas generator according to the present invention, since the first gas generating agent and the second gas generating agent are filled without any gaps in the respective combustion chambers and a space such as described above is not formed, all of the combustion gas generated in the first combustion chamber is more readily transferred to the second gas generating agent in the second combustion chamber and the ignition ability of the entire second gas generating agent is improved.

Known components can be used for the first gas generating agent and the second gas generating agent.

The first gas generating agent and the second gas generating agent may have any shape as long as they are molded. Molded articles with a disk shape, a cylindrical shape, and a cylindrical shape with one or two or more through-holes can be used.

Invention 2 and 4 will be below explained in details. The tubular member has an enlarged diameter part where a diameter of the opening portion has been enlarged in the side of the first opening end portion (in other words, the side of the ignition device and the first combustion chamber). The enlarged diameter part abuts against the inner peripheral surface of the tubular housing. The adjustment of the outer diameter of the enlarged diameter part to be slightly larger than the inner diameter of the tubular housing enables the enlarged diameter part and the inner peripheral surface of the tubular housing to be in press-contact with each other (in contact so as to press each other). Consequently, the tubular member is strongly fixed and the tubular gap (in particular, the tubular gaps having a constant width can be readily formed. In addition, since the combustion products from the first gas generating agent can be prevented from short-passing into the tubular gap, the ignition ability of the entire second gas generating agent can be improved.

The tubular member has a central hole at the center of the bottom surface in the side of the second opening end portion (in other words, the side of the diffuser portion). The central hole penetrates the bottom surface.

The gas diverting member has a cup-like shape and has a communication hole on a peripheral wall portion and a projection oriented toward the second combustion chamber on a bottom surface. The gas diverting member is disposed so that an opening portion is oriented toward the diffuser portion. The gas diverting member is disposed such that the central axis thereof coincides with the central axis of the diffuser portion and the central axis of the tubular housing.

The projection on the bottom surface of the gas diverting member is fitted into the central hole on the second end portion of the tubular member. Consequently, the second end portion-side of the tubular member can be readily fixed and the tubular gap (in particular, the tubular gaps having a constant width can be readily formed. Furthermore, when fixed in this manner, the central axis of the diffuser portion, the central axis of the tubular housing, and the central axis of the gas diverting member can be arranged easily to be consistent with the central axis of the tubular member.

Attachment and fixing (positioning) of the tubular housing is performed easily in this matter, and thereby assembly of the gas generator is preferably performed easily.

While the gas generator according to the present invention does not employ a coolant/filter for cooling/filtering the combustion gas in order to secure reductions in size and weight, a coolant/filter may be used if necessary. When using a coolant/filter, the coolant/filter may be disposed in the tubular gap between the tubular member and the tubular housing, between the first perforated-plate member and the second perforated-plate member, or in the internal space of the diverting member.

With the gas generator according to the present invention, even when the tubular housing has an elongated shape, the entire gas generating agent can be retained over a long period of time and the combustibility of the gas generating agent can be improved regardless of an installation state.

Preferred Embodiments of Invention

An embodiment of the present invention will be described with reference to FIG. 1. FIG. 1 is an axial sectional view of a gas generator.

An igniter 16 that is an ignition device is attached to the side of one end portion 10a of a tubular housing 10. The igniter 16 is a known electric igniter fixed to a collar 17, and an ignition portion 16a containing an ignition charge protrudes from the collar 17.

A diffuser 12 is attached to the side of the other end portion 10b of the tubular housing 10. The diffuser 12 has a substantially cup-like shape and has a flange portion 12a, a peripheral wall portion 12b, and a bottom portion 12c, and is welded and fixed to the tubular housing 10 at the flange portion 12a. A plurality of gas discharge ports 15 are formed on the peripheral wall portion 12b.

A first perforated-plate member 14 is disposed in the side of the igniter 16 of the tubular housing 10 at an interval from the igniter 16. The first perforated-plate member 14 has an annular wall 14a formed on a peripheral edge of a circular bottom surface, and is fixed by the annular wall 14a brought into press-contact with an inner peripheral surface of the tubular housing 10.

A space enclosed by the igniter 16 (the igniter 16 and the collar 17), the tubular housing 10, and the first perforated-plate member 14 corresponds to a first combustion chamber 20. The first combustion chamber 20 is filled with a first gas generating agent 22.

The first gas generating agent 22 is in contact with the ignition portion 16a of the igniter 16. A through-hole (not shown) of the first perforated-plate member 14 is smaller than the first gas generating agent 22. The through-hole may be blocked by a sealing tape.

A gas generating agent having a favorable ignition property and a favorable combustion maintaining property (with a high combustion temperature) may be used as the first gas generating agent 22. The combustion temperature of the first gas generating agent 22 is preferably within a range of 1700 to 3000° C. An example of such a first gas generating agent may be a disk-shaped gas generating agent having an outer diameter of 1.5 mm and a thickness of 1.5 mm, which includes nitroguanidine (34% by weight) and strontium nitrate (56% by weight).

The first gas generating agent 22 is held by the first perforated-plate member 14 in a state where the first gas generating agent 22 is pressed toward the igniter 16.

A cup-shaped member 40 that is a gas diverting member is disposed at an end portion of the diffuser portion 12 side (opposite end portion 10b) in the interior of the tubular housing 10. The cup-shaped member 40 has a bottom surface 40a and a peripheral wall portion 40b. The peripheral wall portion 40b has a plurality of communication holes 40c. A projection 40d is formed at a central part of the bottom surface 40a so as to extend toward the side of the igniter 16.

The cup-shaped member 40 is fixed by a known method (welding or the like) with respect to the flange portion 12a of the diffuser 12. An opening portion of the cup-shaped member 40 is blocked by a sealing tape 45 so that moisture is prevented from infiltrating through the gas discharge ports 15.

An outer diameter of the cup-shaped member 40 is set smaller than an inner diameter of the tubular housing 10. Therefore, a gap 36 exists between the peripheral wall portion 40b and the inner peripheral surface of the tubular housing 10 and comes to a dead end at the flange 12a of the diffuser portion to become a pocket portion (gap) 36. The pocket portion 36 is continuous with a tubular gap 35 and therefore functions to retain a mist contained in combustion gas.

A tubular member 30 is further disposed in the tubular housing 10. The tubular member 30 has an outer diameter that is smaller than an inner diameter of the tubular housing 10 and the tubular gap 35 having a uniform width is formed between the tubular member 30 and the tubular housing 10.

The tubular member 30 has a plurality of gas passage holes 37 axially formed at equal intervals on a peripheral wall portion. The gas passage holes 37 are formed at equal intervals also in a circumferential direction of the tubular member 30. A second combustion chamber 25 and a tubular gap 35 are brought into communication with each other by the gas passage holes 37. Moreover, the gas passage holes 37 may be formed in the nearer side to the diffuser portion 12 on the peripheral wall portion. Alternatively, the gas passage holes 37 may be formed such that the opening areas may be larger to the side of the diffuser portion 12.

The tubular member 30 has an enlarged diameter part 31 formed in a flange-like shape in the side of the igniter 16. An outer peripheral edge 31a of the enlarged diameter part 31 abuts against the inner peripheral surface of the tubular housing 10.

An outer diameter of the outer peripheral edge 31a is set slightly larger than the inner diameter of the tubular housing 10, and when disposed inside the tubular housing 10, the tubular member 30 is brought into press-contact with the inner peripheral surface of the tubular housing 10 due to the resilience of the enlarged diameter part 31. Therefore, a gap is not formed at the press-contact portion. Further, in order to fix the tubular member 30, a step portion that fits into an opening peripheral edge of the enlarged diameter part 31 or a projection that engages the opening peripheral edge of the enlarged diameter part 31 may be formed inside the tubular housing 10.

In FIG. 1, while the enlarged diameter part 31 is shown such that an angle α (refer to FIG. 2) between the enlarged diameter part 31 and a peripheral surface of the tubular member 30 is a right angle, the enlarged diameter part 31 may alternatively be formed so that the angle a is an acute angle or an obtuse angle.

Figure 2:
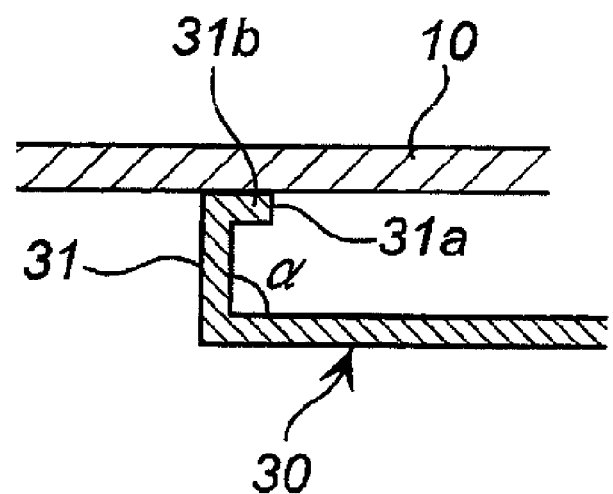
FIG. 2 is a partial enlarged sectional view of a different embodiment from that shown in FIG. 1.

In addition, as shown in FIG. 2, the enlarged diameter part 31 may have an annular replicated portion 31b formed by bending the distal end thereof. In the present embodiment, the annular replicated portion 31b instead of the outer peripheral edge 31a is brought into press-contact with the inner peripheral surface of the tubular housing 10.

In the tubular member 30, a central hole 30d is formed at a central portion of a bottom surface 30a in the side of the diffuser portion 12. The central hole 30d is fitted to the projection 40d formed on the bottom surface 40a of the cup-shaped member 40.

Due to the enlarged diameter part 31 and the inner peripheral surface of the tubular housing 10 being in press-contact with each other and the central hole 30d fitted to the projection 40d of the cup-shaped member 40, the tubular member 30 is fixed in both the axial direction and the radial direction and is disposed on the same axis as the tubular housing 10.

A second perforated-plate member 32 is disposed between the tubular member 30 and the first perforated-plate member 14. The second perforated-plate member 32 has an annular wall 32a formed on a peripheral edge of a circular bottom surface, and is fixed by having the annular wall 32a brought into press-contact with the inner peripheral surface of the tubular housing 10. A space 18 is formed between the second perforated-plate member 32 and the first perforated-plate member 14. The annular wall 32a extends toward the side of the igniter 16.

The second combustion chamber 25 is defined by the second perforated-plate member 32, the tubular member 30, and the tubular housing 10. The second combustion chamber 25 is filled with a second gas generating agent 50. A through-hole (not shown) of the second perforated-plate member 32 is smaller than the second gas generating agent 50. The through-hole may be blocked by sealing tape.

The second combustion chamber 25 includes a space 25a ranging from the enlarged diameter part 31 of the tubular member 30 to the second perforated-plate member 32 and the remaining space 25b which collectively form a single combustion chamber. The space 25a has a larger inner diameter than the space 25b.

A gas generating agent having a lower combustion temperature than that of the first gas generating agent 22 is used as the second gas generating agent 50. The combustion temperature of the second gas generating agent 50 is preferably within a range of 1000 to 1700° C. An example of the second gas generating agent 90 may be a gas generating agent in a shape of a single perforated cylinder having an outer diameter of 1.8 mm, an inner diameter of 0.7 mm and a length of 1.9 mm, which includes guanidine nitrate (41% by weight), basic copper nitrate (49% by weight), a binder and an additive.

The second gas generating agent 50 is held by the second perforated-plate member 32 in a state where the second gas generating agent 50 is pressed toward the diffuser portion 12. Consequently, the second combustion chamber 25 can be densely filled with the second gas generating agent 50 and the formation of a gap due to shifting can be prevented.

Next, an assembly method of the gas generator shown in FIG. 1 will be described.

The diffuser portion 12 having gas discharge ports 15 is fixed by welding to the opening portion in the side of the end portion 10b of the tubular housing 10.

The cup-shaped member (gas diverting member) 40 is attached to the flange portion 12a so that the opening portion side of the cup-shaped member (gas diverting member) 40 faces the diffuser portion 12.

The tubular member 30 is press-fitted from the side of the end portion 10a of the tubular housing 10. At this point, the tubular member 30 is attached so that the outer peripheral edge 31a (in FIG. 2, the annular replicated portion 31b) of the enlarged diameter part 31 thereof abuts against the inner peripheral surface of the tubular housing 10 and the central hole 30d of the tubular member 30 fits to the projection 40d of the cup-shaped member (gas diverting member) 40. Attaching the tubular member 30 in this manner enables positioning and fixing to be easily performed.

Subsequently, after a predetermined amount of the second gas generating agent 50 is filled into the tubular member 30 while tapping the tubular housing 10, the second perforated-plate member 32 is press-fitted into the tubular housing 10 to form the second combustion chamber 25 filled with the second gas generating agent 50. By press-fitting the second perforated-plate member 32 in this manner, the second gas generating agent 50 is densely filled and shifting of the agent is prevented. Therefore, a gap is prevented from forming inside the second combustion chamber 25.

The first perforated-plate member 14 is then press-fitted and the first gas generating agent 22 is filled so as to abut against the first perforated-plate member 14. The first perforated-plate member 14 is disposed in advance nearer the end portion 10a, and when inserting the collar 17 from the end portion 10a, the first perforated-plate member 14 is pressed in deeply together with the first gas generating agent 22.

Subsequently, the igniter 16 fixed to the collar 17 is attached to form the first combustion chamber 20.

Next, operations of the gas generator shown in FIG. 1 will be described.

When the first gas generating agent 22 in the first combustion chamber 20 burns due to an activation of the igniter 16, combustion products (flames and high-temperature gas) are generated, pass through the holes of the first perforated-plate member 14 and enter the space 18. In addition, since the first combustion chamber 20 is densely filled with the first gas generating agent 22, spotty ignition (a phenomenon where combustion occurs in spots) is less likely to occur and the first gas generating agent 22 is burned evenly. The combustion products enter the space 18.

The combustion products pass through a through-hole of the second perforated-plate member 32 from the space 18 and ignite the second gas generating agent 50 that exists in the second combustion chamber 25. At this point, the second gas generating agent 50 that is present in the space 25a is initially ignited. Since the combustion products, generated from the first combustion chamber 20, once enter the space 18, the second gas generating agent 50 adjacent to the second perforated-plate member 32 (the second gas generating agent 50 in the space 25a) starts burning uniformly from an end surface. Therefore, spotty ignition is unlikely to occur.

Due to the enlarged diameter part 31, the flow rate of the combustion products of the second gas generating agent 50 in the space 25a increases upon entering the space 25b. In addition, since the enlarged diameter part 31 and the inner peripheral surface of the tubular housing 10 are in press-contact with each other, combustion products do not flow into the tubular gap 35 from the press-contact portion. Therefore, since the entire amount of the generated combustion products and combustion gas flows into the space 25b, the capability to ignite the second gas generating agent 50 in the space 25b is maintained.

The combustion gas and the combustion products flow into the tubular gap 35 from the gas passage holes 37, strike the inner peripheral surface of the tubular housing 10, and after changing directions, flow toward the diffuser 12. Residue contained in the process adheres to the inner peripheral surface of the tubular housing 10.

Furthermore, the combustion gas and the combustion products strike the flange portion 12a of the diffuser 12 and change directions, and enter the cup-shaped member 40 from the communication holes 40c. Residue is also collected in the pocket 36 in this process. Subsequently, the combustion gas and the combustion products strike the bottom portion 12c of the diffuser 12 and change directions once again, and are discharged from the gas discharge ports 15.

If the first gas generating agent 22 in the first combustion chamber 20 is not densely filled, when the gas generator in a horizontally-disposed state as shown in FIG. 3 is activated, vibration from the vehicle over a long period of time may cause a gap 53 to be formed between the first gas generating agent 22 and the tubular housing 10. When the gap 53 is formed, the generated combustion products become more likely to preferentially flow into the gap 53 as indicated by the arrow A, not only causing spotty ignition and combustion of the first gas generating agent 22 but also affecting the ignition ability to the second gas generating agent 50.

If the second gas generating agent 50 in the second combustion chamber 25 is not densely filled, when the gas generator in a horizontally-disposed state as shown in FIG. 3 is activated, vibration from the vehicle over a long period of time may cause a gap 55 to be formed between the second gas generating agent 50 and the tubular housing 10. When the gap 55 is formed, the generated combustion products become more likely to preferentially flow into the gap 55 as indicated by the arrow B, not only causing spotty ignition and combustion of the second gas generating agent 50 but also making the combustion gas generated from the second gas generating agent 50 and combustion products from the first gas generating agent 22 more likely to be preferentially discharged from the gas passage holes 37 via the gap 55.

Since the gas generator according to the present invention is structured as described above, spotty ignition of the gas generating agents can be suppressed and overall ignition and combustion performance can be improved. In particular, with a gas generator structured with an axially-elongated housing and a first combustion chamber and a second combustion chamber axially-adjacent to each other, a gas generating agent can be smoothly burned and speedy activation of the gas generator can be realized.

The invention thus described, it will be obvious that the same maybe varied in many ways. Such variations are not to be regarded as a departure from the spirit and scope of the invention, and all such modifications as would be obvious to one skilled in the art are intended to be included within the scope of the following claims.

The invention claimed is:

1. A gas generator, comprising:
a tubular housing, an ignition device attached to one end of the tubular housing, a diffuser portion having a gas discharge port and being attached to the other end of the tubular housing,
in the tubular housing,
a first combustion chamber defined by a first perforated-plate member on one end side in the tubular housing and filled with a first gas generating agent,
a tubular member disposed in the remaining inner space of the tubular housing and having a communication hole on a peripheral wall portion thereof, a second-perforated plate member disposed between the first perforated-plate member and the tubular member, a second combustion chamber defined by the tubular member and filled with a second gas generating agent,
the tubular member being disposed so that a gap is formed between the peripheral wall portion of the tubular housing and the tubular member, the tubular member having a first opening end portion abutting against the inner peripheral surface of the tubular housing in the side of the first perforated-plate member and a second end portion supported in the side of the diffuser portion.

2. A gas generator according to claim 1, wherein
the tubular member includes an enlarged diameter part provided with an increased diameter at an opening portion in a side of the first opening end portion and a central hole at the center of a bottom surface in a side of the second end portion,
a cup-shaped gas diverting member having a communication hole on a peripheral wall portion and a projection on a bottom surface is disposed in the side of the diffuser portion so that an opening portion of the gas diverting member is oriented toward the diffuser portion,
the enlarged diameter part of the tubular member abuts against the inner peripheral surface of the tubular housing, and
the central hole of the tubular member is fitted to the projection on the bottom surface of the gas diverting member.

3. A method of assembling the gas generator according to claim 2, comprising:
- a step of attaching a cup-shaped gas diverting member, having a communication hole on a peripheral wall portion and a projection on a bottom surface, inside a tubular housing, the tubular housing including a diffuser portion having a gas discharge port attached to the other end so that an opening portion of the gas diverting member is oriented toward the diffuser portion;
- a step of attaching a tubular member so that an outer peripheral surface of an enlarged diameter part of the tubular member abuts against an inner peripheral surface of the tubular housing and a central hole of the tubular member fits to the projection on the bottom surface of the gas diverting member;
- a step of filling the tubular member with a predetermined amount of a second gas generating agent while tapping the tubular housing;
- a step of press-fitting a second perforated-plate to form a second combustion chamber filled with the second gas generating agent;
- a step of press-fitting a first perforated-plate member;
- a step of charging a first gas generating agent so as to abut against the first perforated-plate member; and
- a step of attaching an ignition device.

4. A method of assembling the gas generator according to claim 1, comprising:
- a step of attaching a tubular member inside a tubular housing to which a diffuser portion having a gas discharge port is attached on the other end;
- a step of filling the tubular member with a predetermined amount of a second gas generating agent from one end of the tubular housing while tapping the tubular housing;
- a step of press-fitting a second perforated-plate member from one end of the tubular housing to form a second combustion chamber filled with the second gas generating agent;
- a step of press-fitting a first perforated-plate member from one end of the tubular housing;
- a step of charging a first gas generating agent from one end of the tubular housing so as to abut against the first perforated-plate member; and
- a step of attaching an ignition device to one end of the tubular housing.

* * * * *